(12) United States Patent
Kume et al.

(10) Patent No.: US 11,286,437 B2
(45) Date of Patent: Mar. 29, 2022

(54) SLAG DISCHARGE DEVICE, GASIFIER FURNACE AND INTEGRATED GASIFICATION COMBINED CYCLE, AND SLAG DISCHARGE METHOD

(71) Applicant: Mitsubishi Hitachi Power Systems, Ltd., Yokohama (JP)

(72) Inventors: Tatsuya Kume, Kanagawa (JP);
Haruto Shinoda, Kanagawa (JP);
Yoshiaki Arakawa, Tokyo (JP);
Yoshinori Koyama, Tokyo (JP);
Yasunari Shibata, Kanagawa (JP);
Yasuyuki Miyata, Tokyo (JP); Masashi Kitada, Kanagawa (JP)

(73) Assignee: MITSUBISHI POWER, LTD., Yokohama (JP)

( * ) Notice: Subject to any disclaimer, the term of this patent is extended or adjusted under 35 U.S.C. 154(b) by 0 days.

(21) Appl. No.: 16/969,233

(22) PCT Filed: Feb. 14, 2019

(86) PCT No.: PCT/JP2019/005335
§ 371 (c)(1),
(2) Date: Aug. 12, 2020

(87) PCT Pub. No.: WO2019/163634
PCT Pub. Date: Aug. 29, 2019

(65) Prior Publication Data
US 2021/0002567 A1    Jan. 7, 2021

(30) Foreign Application Priority Data
Feb. 23, 2018   (JP) .............................. JP2018-031058

(51) Int. Cl.
*C10J 3/52* (2006.01)
*C10J 3/72* (2006.01)

(52) U.S. Cl.
CPC ................. *C10J 3/52* (2013.01); *C10J 3/723* (2013.01); *C10J 2200/09* (2013.01);
(Continued)

(58) Field of Classification Search
CPC .... C10J 3/723; C10J 2200/09; C10J 2200/36; C10J 2300/1606; C10J 2300/1628;
(Continued)

(56) References Cited

U.S. PATENT DOCUMENTS

2014/0090296 A1* 4/2014 Talcott ..................... C10J 3/485
48/61
2016/0257895 A1 9/2016 Soda et al.
(Continued)

FOREIGN PATENT DOCUMENTS

| JP | 2015-117373 A | 6/2015 |
|---|---|---|
| JP | 2017-154119 A | 9/2017 |
| JP | 2017-179113 A | 10/2017 |

OTHER PUBLICATIONS

International Search Report dated May 7, 2019, issued in counterpart application No. PCT/JP2019/005335 , w/English translation (4 pages).
(Continued)

*Primary Examiner* — Matthew J Merkling
(74) *Attorney, Agent, or Firm* — Westerman, Hattori, Daniels & Adrian, LLP

(57) ABSTRACT

An object is to curb damage localized in a slag capturing portion caused when slag passes therethrough. A slag discharge device includes: a screen mesh (6) that is a porous member including a plurality of through-holes (6*a*) formed therein; and a crushing device (7) that crushes water-granulated slag (S2) captured by the screen mesh (6). The crushing device has a crusher head (12) that breaks, with a pressure, and thus crushes the water-granulated slag (S2), a hydraulic
(Continued)

cylinder (13) that reciprocates the crusher head in a predetermined direction, a guide plate (14) that restricts movement of the crusher head caused by the hydraulic cylinder, and a plurality of crushing spaces (15) in which the water-granulated slag (S2) is crushed. A communication opening that causes the crushing spaces (15) to communicate with each other is formed in a partitioning wall guide plate (14a) of the guide plate.

6 Claims, 9 Drawing Sheets

(52) U.S. Cl.
CPC ...... *C10J 2200/36* (2013.01); *C10J 2300/165* (2013.01); *C10J 2300/1606* (2013.01); *C10J 2300/1628* (2013.01); *C10J 2300/1653* (2013.01); *C10J 2300/1671* (2013.01); *C10J 2300/1675* (2013.01); *Y02E 20/18* (2013.01)

(58) Field of Classification Search
CPC .......... C10J 2300/165; C10J 2300/1653; C10J 2300/1671; C10J 2300/1675
See application file for complete search history.

(56) References Cited

U.S. PATENT DOCUMENTS

| | | |
|---|---|---|
| 2017/0342337 A1 | 11/2017 | Miyata et al. |
| 2019/0030543 A1* | 1/2019 | Ohashi .................. B02C 1/00 |

OTHER PUBLICATIONS

Written Opinion dated May 7, 2019, issued in counterpart application No. PCT/JP2019/005335 (4 pages).

* cited by examiner

SLAG DISCHARGE DEVICE, GASIFIER FURNACE AND INTEGRATED GASIFICATION COMBINED CYCLE, AND SLAG DISCHARGE METHOD

TECHNICAL FIELD

The present invention relates to a slag discharge device, a gasifier furnace, an integrated gasification combined cycle, and a slag discharge method.

BACKGROUND ART

As a gasifier furnace unit of the related art, a carbonaceous fuel gasification unit (coal gasification unit) adapted to generate combustible gas by supplying carbonaceous feedstock such as coal into gasifier furnaces and partially burning the carbonaceous feedstock to gasify the carbonaceous feedstock is known.

Some gasifier furnaces are provided with discharge devices adapted to discharge ash content of the carbonaceous feedstock put into the gasifier furnaces. In such a gasifier furnace, for example, ash content in carbonaceous feedstock put into a gasifier furnace is melted and captured by a combustor of the gasifier furnace, flows down as molten slag into slag bath water at a lower portion of a gasifier furnace pressure vessel due to gravity, and is suddenly cooled down in the slag bath water to be water-granulated and solidified, thereby forming water-granulated slag (hereinafter, described as slag). The slag settles out in the water and is then discharged to the outside of the gasifier furnace. At this time, the slag needs to have a particle size that is equal to or less than a specific particle size in order to prevent slag blockage in the middle of a flow path for discharging the slag to the outside of the gasifier furnace. Thus, there is a gasifier furnace provided with a device (slag crusher) adapted to cause slag to drop onto a screen and capture and crush slag with a particle size larger than a specific particle size that has been sorted using an aperture size of the screen (PTL 1, for example).

The gasifier furnace in PTL 1 includes a slag capturing surface (screen mesh) adapted to capture slag with a particle size exceeding the specific particle size from water-granulated slag settling out and a crushing device adapted to crush the captured slag, thereby enabling stable discharge of the slag to the outside of the pressure vessel of the gasifier furnace.

CITATION LIST

Patent Literature

[PTL 1]
Japanese Unexamined Patent Application, Publication No. 2015-117373

SUMMARY OF INVENTION

Technical Problem

In the gasifier furnace, a slag flowing-down port may be provided at a combustor furnace bottom portion, and molten slag may be caused to flow down from the slag flowing-down port using the gravity, such that the molten slag stably flows down when the molten slag flows down into slag bath water.

In a case in which such a structure for causing molten slag to flow down from a slag flowing-down port is applied to the slag capturing surface and the crushing device for crushing captured water-granulated slag as in PTL 1, the amount of passing slag increases in a limited range of a portion vertically below the slag flowing-down port and the vicinity thereof in the slag capturing surface. Therefore, there is a problem that durability life-time of that portion in the slag capturing surface may be shortened as compared with the other portions.

The present invention has been made in view of such circumstances, and an object thereof is to provide a slag discharge device, a gasifier furnace and an integrated gasification combined cycle, and a slag discharge method capable of curbing localization of damage on a slag capturing portion caused when slag passes therethrough.

Solution to Problem

In order to solve the aforementioned problem, a slag discharge device, a gasifier furnace and an integrated gasification combined cycle, and a slag discharge method according to the present invention employ the following means.

A slag discharge device according to an aspect of the present invention is a slag discharge device that discharges, from a gasifier furnace adapted to gasify carbonaceous feedstock, slag that is generated at a combustor portion of the gasifier furnace and drops from the combustor portion, the slag discharge device including: a capturing portion that is a porous member provided vertically below the combustor portion so as to intersect a dropping direction of the slag and including a plurality of through-holes formed therein, that allows the slag smaller than the through-holes to pass therethrough, and that captures the slag larger than the through-holes; and a crushing means for crushing the slag captured by the capturing portion, in which the crushing means has a plurality of crushing portions that break, with a pressure, and thus crush the slag that is present on a main capturing surface that is an upper surface of the capturing portion in a vertical direction, a drive portion that reciprocates the crushing portions in a predetermined direction along the main capturing surface, regulation portions that regulate a direction of moving of the crushing portions caused by the drive portion, and a plurality of crushing spaces that are sectioned by the main capturing surface, the crushing portions, and the regulation portions, and in which the slag is crushed, and in the regulation portions, a communication portion that causes the plurality of crushing spaces of the crushing means to communicate with each other is formed.

In the aforementioned configuration, a slag bath filled with cooling water is provided at a vertically lower portion inside the gasifier furnace, and the slag smaller than the through-holes formed in the capturing portion in the slag that is molten slag dropping from the combustor portion of the gasifier furnace into the slag bath and suddenly cooled therein passes through the capturing portion and is then discharged from the slag discharge device. On the other hand, the slag larger than the through-holes formed in the capturing portion is captured by the capturing portion and is accumulated on the main capturing surface that is the upper surface of the capturing portion in the vertical direction. In other words, since the main capturing surface sections the space in the slag bath, the slag captured by the capturing portion is accumulated on the main capturing surface. The slag accumulated on the main capturing surface is broken, with a pressure, and is thus crushed by the drive portion reciprocating the crushing portions of the crushing means in the predetermined direction along the main capturing surface. The slag is crushed into a size smaller than the through-holes by the crushing portions. The slag that has been crushed into a size smaller than the through-holes passes through the through-holes in the capturing portion and is then discharged from the slag discharge device of the gasifier furnace. It is possible to cause the slag that is to be discharged from the slag discharge device of the gasifier furnace to have a size that is equal to or less than a predetermined particle size in this manner and thereby to prevent blockage of a flow path for discharging the slag to the outside of the pressure vessel.

Here, since the regulation portions that regulate the direction of moving of the crushing portions when the drive portion reciprocates the crushing portions in the predetermined direction is provided, it is possible to curb damage on the drive portion using a reaction force generated in a direction that is different from the direction of moving of the crushing portions when the crushing portions breaks the slag with a pressure.

Also, the main capturing surface, the plurality of crushing portions, and the plurality of regulation portions section the space in which the slag is crushed and form the plurality of crushing spaces. In the aforementioned configuration, the communication portion is formed in the regulation portion. In this manner, a part of the slag crushed by the pressure from the crushing portions passes through the communication portion and moves into other adjacent crushing spaces when the crushing portions break, with a pressure, the slag in the crushing spaces. Since a part of the slag captured by the capturing portion is distributed into the plurality of crushing spaces in this manner, it is possible to curb uneven distribution to the slag at a specific crushing space. Further, it is possible to reduce a load of each of the crushing portions when the crushing portions break the slag with a pressure, thereby to improve reliability, and to extend the lifetime, by configuring the crushing portions in a plurality of sets.

Therefore, it is possible to curb positional localization of the slag passing through the through-holes in the capturing portion. It is thus possible to curb localization of damage due to friction and the like of the capturing portion when the slag passes therethrough. Also, since it is possible to curb uneven distribution of the slag to a specific crushing space, it is possible to curb a situation in which only a specific crushing portion crushes the slag at an unevenly high frequency, to curb damage on the entire crushing portions, and to extend the lifetime.

Also, in the slag discharge device according to an aspect of the present invention, the plurality of crushing spaces may be disposed to be aligned in a direction that intersects the predetermined direction, and a jetting means for jetting a fluid may be provided in a direction that intersects the dropping direction of the slag and intersects the predetermined direction between the combustor portion and the capturing portion.

In the aforementioned configuration, the plurality of crushing spaces are disposed to be aligned in the direction that intersects the predetermined direction, and the jetting means provided between the combustor portion and the capturing portion is adapted to jet a fluid such as a slag bath supply water in the direction that intersects the predetermined direction. In other words, the jetting means is adapted to jet the fluid in an alignment direction of the plurality of crushing spaces. In this manner, the slag accumulated on the main capturing surface is distributed into the alignment direction of the plurality of crushing space by the fluid jetted from the jetting means. Therefore, since the slag is distributed into the plurality of crushing spaces, it is possible to curb uneven distribution of the slag to one crushing space.

Also, in the slag discharge device according to an aspect of the present invention, the plurality of crushing spaces may be disposed to be aligned in a direction that intersects the predetermined direction, and a distribution portion that distributes the slag dropping from the combustor portion in the direction intersecting the predetermined direction may be provided between the combustor portion and the capturing portion.

In the aforementioned configuration, the plurality of crushing spaces are disposed to be aligned in the direction that intersects the predetermined direction, and the distribution portion provided between the combustor portion and the capturing portion disperses and distributes the slag in the direction that intersects the predetermined direction. In other words, at least a part of the slag dropping from the combustor portion into the slag bath and solidified therein is dispersed by the distribution portion changing the dropping direction thereof, the slag is thus dispersed and distributed in the alignment direction of the plurality of crushing spaces, and the slag is accumulated on the main capturing surface in a distributed manner. Thus, since the slag is distributed into the plurality of crushing spaces, it is possible to curb uneven distribution of the slag to one crushing space.

A gasifier furnace according to an aspect of the present invention includes: the slag discharge device according to any one of the aforementioned aspects.

An integrated gasification combined cycle according to an aspect of the present invention includes: the aforementioned gasifier furnace; a gas turbine that is driven to rotate by burning at least a part of raw syngas generated in the gasifier furnace; a steam turbine that is driven to rotate by steam generated by a heat recovery steam generator that introduces turbine flue gas discharged from the gas turbine thereinto; and a generator that is rotatably coupled to the gas turbine and/or the steam turbine.

A slag discharge method according to an aspect of the present invention is a slag discharge method using a slag discharge device that discharges, from a gasifier furnace adapted to gasify carbonaceous feedback, slag generated at a combustor portion of the gasifier furnace and dropping from the combustor portion, the slag discharge device including a capturing portion that is a porous member provided vertically below the combustor portion so as to intersect a dropping direction of the slag and including a plurality of through-holes formed therein, that allows the slag smaller than the through-holes to pass therethrough, and that captures the slag larger than the through-holes; and a crushing means for crushing the slag captured by the capturing portion, in which the crushing means has a plurality of crushing portions that break, with a pressure, and thus crush the slag that is present on a main capturing surface that is an upper surface of the capturing portion in a vertical direction, a drive portion that reciprocates the crushing portions in a predetermined direction along the main capturing surface, regulation portions that regulate a direction of moving of the crushing portions caused by the drive portion, and a plurality of crushing spaces that are sectioned by the main capturing surface, the crushing portions, and the regulation portions, and in which the slag is crushed, and in the regulation portions, a communication portion that causes the plurality of crushing spaces of the crushing means to communicate with each other is formed, the slag discharge method including: allowing a part of the crushed slag to pass through the communication portion and crushing the slag using the crushing means.

Advantageous Effects of Invention

According to the present invention, it is possible to curb localization of damage on a slag capturing portion caused when slag passes therethrough.

DESCRIPTION OF EMBODIMENTS

Hereinafter, embodiments of a slag discharge device, a gasifier furnace and an integrated gasification combined cycle, and a slag discharge method according to the present invention will be described with reference to drawings.

Note that positional relationships of each component described using expressions such as an upper side and a lower side will represent a vertically upper side and a vertically lower side, respectively, in the embodiments.

First Embodiment

A first embodiment will be described on the basis of FIGS. 1 to 8.

Integrated Coal Gasification Combined Cycle

Figure 1:
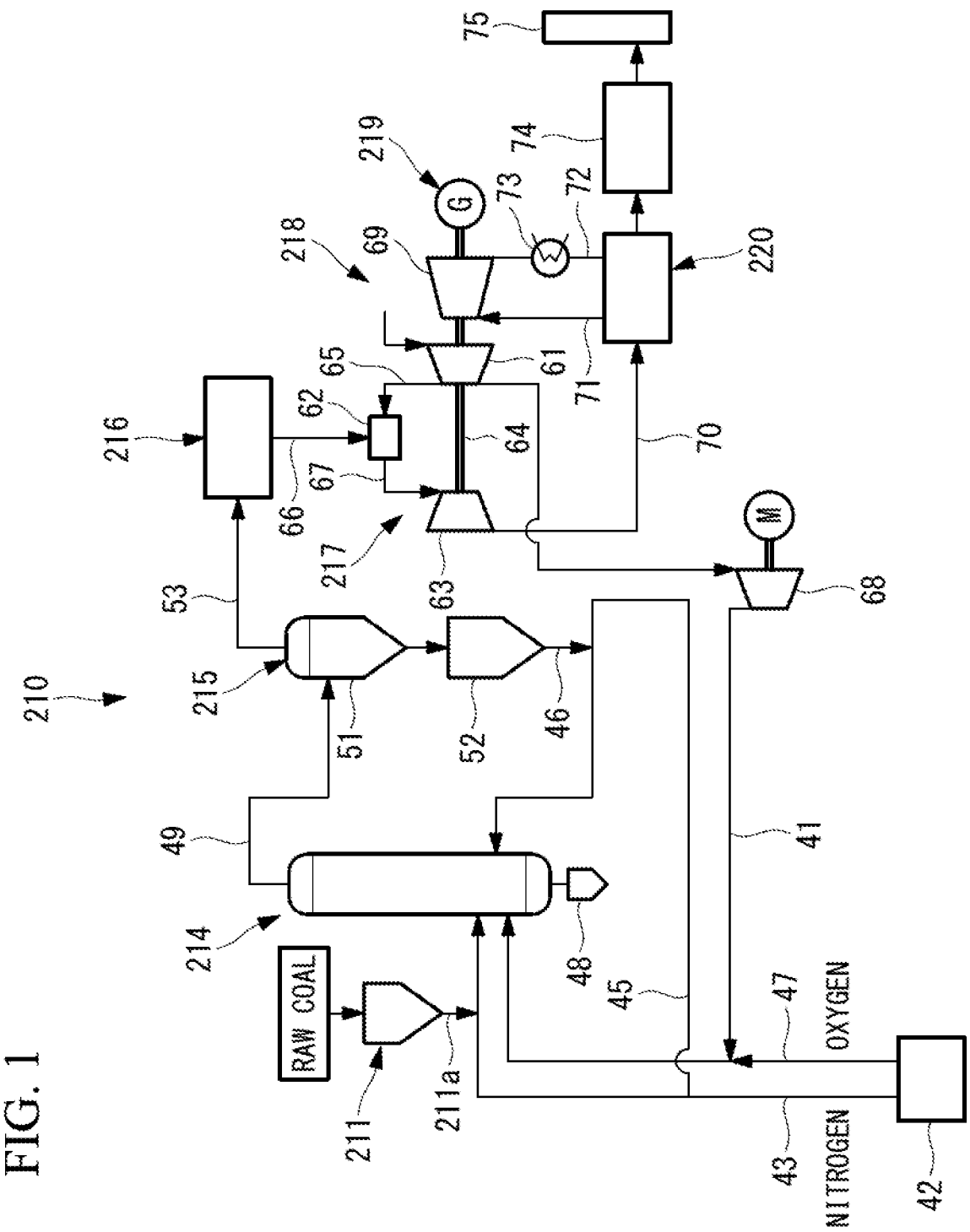
FIG. 1 is an overview configuration diagram illustrating an integrated coal gasification combined cycle according to an embodiment of the present invention.

FIG. 1 is an overview configuration diagram of an integrated coal gasification combined cycle to which a gasifier furnace unit according to an embodiment of the present invention is applied.

An integrated coal gasification combined cycle (IGCC) 210 to which a gasifier furnace unit 214 according to the embodiment is applied uses air as a main oxygen containing gas, and the gasifier furnace unit 214 employs an air combustion scheme in which combustible gas (raw syngas) is generated from a fuel. The integrated coal gasification combined cycle 210 then purifies the raw syngas generated in the gasifier furnace unit 214 into fuel gas using a gas clean-up unit 216 and supplies the fuel gas to a gas turbine 217 to generate power. In other words, the integrated coal gasification combined cycle 210 according to the first embodiment is a power generation unit of an air combustion scheme (air blowing). As the fuel supplied to the gasifier furnace unit 214, carbonaceous feedstock such as a coal, for example, is used.

As illustrated in FIG. 1, the integrated coal gasification combined cycle 210 includes a coal supply unit 211, the gasifier furnace unit 214, a char recovery unit 215, the gas clean-up unit 216, the gas turbine 217, a steam turbine 218, a generator 219, and a heat recovery steam generator (HRSG) 220.

Coal that is carbonaceous feedstock is supplied as raw coal to the coal supply unit 211, and the coal supply unit 211 crushes the coal using a coal mill (not illustrated) or the like, thereby producing pulverized coal crushed into a minute particle form. The pulverized coal produced by the coal supply unit 211 is pressurized by nitrogen gas that is inert gas for transport supplied from an air separation unit (ASU) 42, which will be described later, at an outlet of a coal supply line 211a and is then supplied toward the gasifier furnace unit 214. The inert gas is non-reactive gas with oxygen content of equal to or less than about 5% by volume, and representative examples thereof include nitrogen gas, carbon dioxide gas, and argon gas. However, the inert gas is not necessarily limited to the gas with the oxygen content of equal to or less than about 5% by volume.

To the gasifier furnace unit 214, the pulverized coal produced by the coal supply unit 211 is supplied, and also, char (an unreacted part of the coal and ash content) recovered by the char recovery unit 215 is returned and supplied for the purpose of reusing it.

Also, a compressed air supply line 41 from the gas turbine 217 (compressor 61) is connected to the gasifier furnace unit 214, and a pressure of a part of compressed air that is compressed by the gas turbine 217 is boosted to a predetermined pressure by a booster 68 such that the part of compressed air can be supplied to the gasifier furnace unit 214. The air separation unit 42 is adapted to separate and generate nitrogen and oxygen from the air in the atmosphere, and the air separation unit 42 and the gasifier furnace unit 214 are connected to each other with a first nitrogen supply line 43. Also, the coal supply line 211a from the coal supply unit 211 is connected to the first nitrogen supply line 43. In addition, a second nitrogen supply line 45 branched from the first nitrogen supply line 43 is also connected to the gasifier furnace unit 214, and a char returning line 46 from the char recovery unit 215 is connected to the second nitrogen supply line 45. Further, the air separation unit 42 is connected to the compressed air supply line 41 with an oxygen supply line 47. Also, the nitrogen separated by the air separation unit 42 is distributed through the first nitrogen supply line 43 and the second nitrogen supply line 45 and is thus used as a gas for transporting the coal and the char. In addition, the oxygen separated by the air separation unit 42 is distributed through the oxygen supply line 47 and the compressed air supply line 41 and is thus used as oxygen containing gas in the gasifier furnace unit 214.

Figure 2:
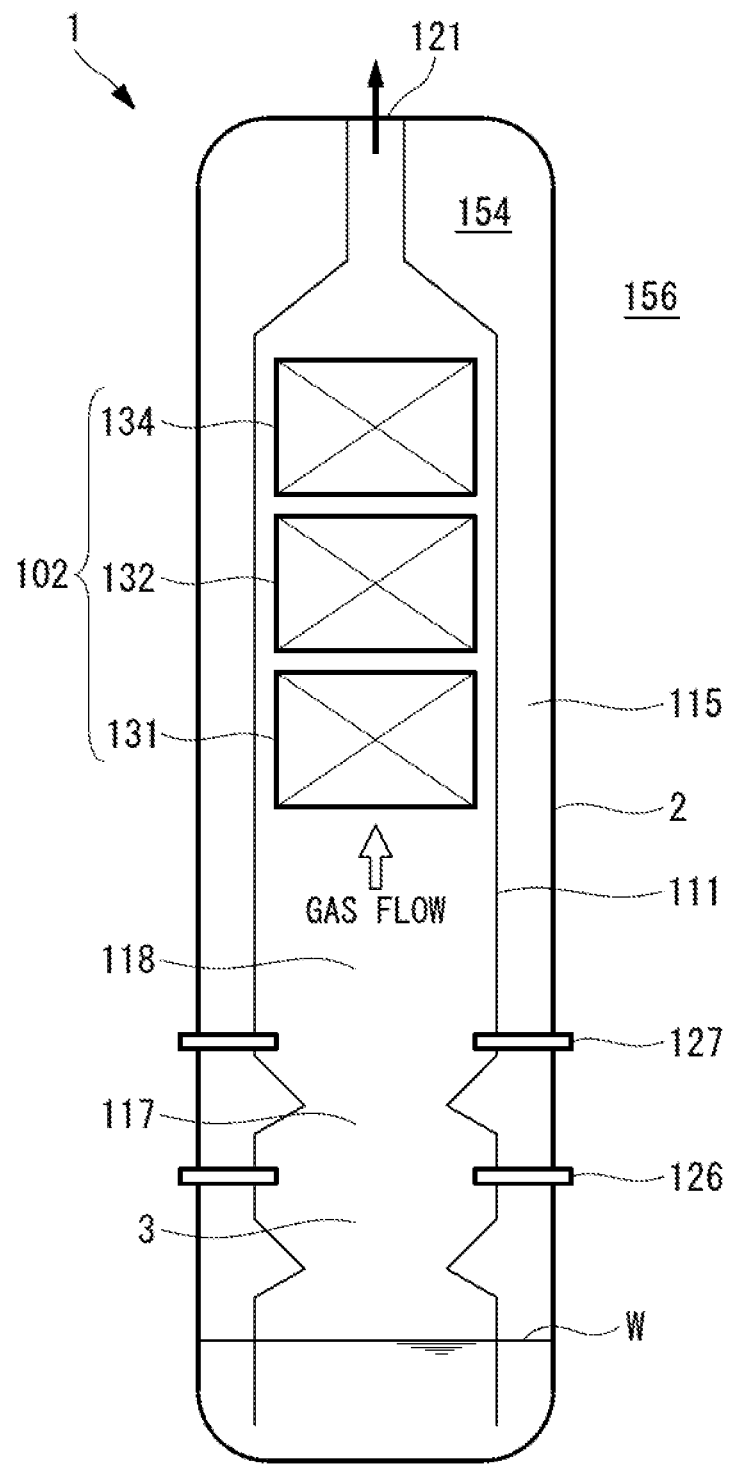
FIG. 2 is an overview configuration diagram illustrating a gasifier furnace unit in FIG. 1.

The gasifier furnace unit 214 includes a gasifier furnace 1 (see FIGS. 2 and 3) of a two-stage entrained-flow type, for example. The gasifier furnace unit 214 partially burns the coal (pulverized coal) and the char supplied thereinto with oxygen containing gas (air, oxygen) and thus gasifies the coal and the char into raw syngas. Note that the gasifier furnace unit 214 is provided with a foreign matter removing unit 48 adapted to remove foreign matters (slag) mixed into the pulverized coal. Also, a gas generation line 49 adapted to supply the raw syngas toward the char recovery unit 215 is connected to the gasifier furnace unit 214 such that the raw syngas containing the char can be discharged. In this case, the gas generation line 49 may be provided with a syngas cooler 102 (gas cooler) as illustrated in FIG. 2 to cool the raw syngas to a predetermined temperature and then supply the raw syngas to the char recovery unit 215.

The char recovery unit 215 includes a dust collecting unit 51 and a supply hopper 52. In this case, the dust collecting unit 51 is configured of one or a plurality of cyclones or porous filters and can separate the char contained in the raw syngas generated in the gasifier furnace unit 214.

The raw syngas, from which the char has been separated, is fed to the gas clean-up unit 216 through the gas discharge line 53. The supply hopper 52 stores the char separated from the raw syngas by the dust collecting unit 51. Note that a configuration in which a plurality of supply hoppers 52 are connected to a bin with the bin disposed between the dust collecting unit 51 and the supply hoppers 52 may be employed. Also, the char returning line 46 from the supply hopper 52 is connected to the second nitrogen supply line 45.

The gas clean-up unit 216 is adapted to perform gas purification on the raw syngas, from which the char has been separated by the char recovery unit 215, by removing impurities such as sulfur compounds and nitrogen compounds therefrom. The gas clean-up unit 216 then purifies the raw syngas to produce fuel gas and supplies the fuel gas to the gas turbine 217. Note that since sulfur content (such as $H_2S$) is still contained in the raw syngas from which the char has been separated, the gas clean-up unit 216 removes and recovers the sulfur content using an amine absorbent or the like and effectively use the sulfur content.

The gas turbine 217 includes a compressor 61, a combustor 62, and a turbine 63, and the compressor 61 and the turbine 63 are coupled to each other with a rotation shaft 64. To the combustor 62, a compressed air supply line 65 from the compressor 61 is connected, a fuel gas supply line 66 from the gas clean-up unit 216 is connected, and also a combustion gas supply line 67 extending toward the turbine 63 is connected. Also, the gas turbine 217 is provided with the compressed air supply line 41 extending from the compressor 61 to the gasifier furnace unit 214, and the booster 68 is provided at a midpoint thereof. Thus, the combustor 62 burns a part of the compressed air supplied from the compressor 61 and at least a part of the fuel gas supplied from the gas clean-up unit 216 in a mixed manner to generate combustion gas and then supplies the generated combustion gas toward the turbine 63. The turbine 63 then drives the rotation shaft 64 to rotate by the supplied combustion gas, thereby driving the generator 219 to rotate.

The steam turbine 218 includes a turbine 69 coupled to the rotation shaft 64 of the gas turbine 217, and the generator 219 is coupled to a proximal end portion of the rotation shaft 64. A flue gas line 70 from the gas turbine 217 (turbine 63) is connected to the heat recovery steam generator 220, and the heat recovery steam generator 220 generates steam through heat exchange between water supplied to the heat recovery steam generator 220 and the flue gas from the turbine 63. Also, the heat recovery steam generator 220 is provided with a steam supply line 71 between the heat recovery steam generator 220 and the turbine 69 of the steam turbine 218 and with a steam recovery line 72, and the steam recovery line 72 is provided with a condenser 73. In addition, the steam generated by the heat recovery steam generator 220 may contain steam generated through heat exchange with the raw syngas at the syngas cooler 102 of the gasifier furnace 1. Thus, the steam turbine 218 drives the turbine 69 to rotate with the steam generated from the heat recovery steam generator 220 and thus causes the rotation shaft 64 to rotate, thereby driving the generator 219 to rotate.

Also, a gas purification unit 74 is provided from the outlet of the heat recovery steam generator 220 to a stack 75.

Here, actions of the integrated coal gasification combined cycle 210 according to the embodiment will be described.

When raw coal (coal) is supplied to the coal supply unit 211 in the integrated coal gasification combined cycle 210 according to the embodiment, the coal is pulverized into a minute particle form by the coal supply unit 211 and is formed into pulverized coal. The pulverized coal produced by the coal supply unit 211 is distributed through the first nitrogen supply line 43 using nitrogen supplied from the air separation unit 42 and is supplied to the gasifier furnace unit 214. Also, the char recovered by the char recovery unit 215, which will be described later, is distributed through the second nitrogen supply line 45 using nitrogen supplied from the air separation unit 42 and is supplied to the gasifier furnace unit 214. Further, the pressure of the compressed air extracted from the gas turbine 217, which will be described later, is boosted by the booster 68, and the compressed air is then supplied along with oxygen supplied from the air separation unit 42 to the gasifier furnace unit 214 through the compressed air supply line 41.

The gasifier furnace unit 214 burns the supplied pulverized coal and the char with the compressed air (oxygen) and gasifies the pulverized coal and the char, thereby generating raw syngas. The raw syngas is then discharged from the gasifier furnace unit 214 through the gas generation line 49 and is fed to the char recovery unit 215.

In the char recovery unit 215, the raw syngas is supplied to the dust collecting unit 51 first, and minute particulate char contained in the raw syngas is separated therefrom. Then, the raw syngas from which the char has been separated is fed to the gas clean-up unit 216 through the gas discharge line 53. On the other hand, the minute particulate char separated from the raw syngas is accumulated in the supply hopper 52, is returned to the gasifier furnace unit 214 through the char returning line 46, and is recycled.

Gas purification of the raw syngas from which the char has been separated by the char recovery unit 215 is performed by the gas clean-up unit 216 removing impurities such as sulfur compounds and nitrogen compounds therefrom, and fuel gas is thus produced. The compressor 61 generates compressed air and supplies the compressed air to the combustor 62. The combustor 62 mixes the compressed air supplied from the compressor 61 with the fuel gas supplied from the gas clean-up unit 216 and burns the compressed air and the fuel gas, thereby generating combustion gas. The turbine 63 is driven to rotate using the combustion gas, and the compressor 61 and the generator 219 are thus driven to rotate via the rotation shaft 64. In this manner, the gas turbine 217 can generate power.

Then, the heat recovery steam generator 220 generates steam through heat exchange between the flue gas from the turbine 63 of the gas turbine 217 and the water supplied to the heat recovery steam generator 220 and supplies the generated steam to the steam turbine 218. The steam turbine 218 can drive the turbine 69 to rotate with the steam supplied from the heat recovery steam generator 220 and thus drives the generator 219 to rotate via the rotation shaft 64, thereby generating power.

Note that the gas turbine 217 and the steam turbine 218 may not serve as the same shaft to drive the one generator 219 to rotate and may serve as different shafts to drive a plurality of generators to rotate.

Thereafter, toxic substances in exhaust gas discharged from the heat recovery steam generator 220 are removed by the gas purification unit 74, and purified exhaust gas is discharged from the stack 75 to the atmosphere.

Next, the gasifier furnace unit 214 in the aforementioned integrated coal gasification combined cycle 210 will be described in detail with reference to FIGS. 1 and 2. FIG. 2 is an overview configuration diagram illustrating the gasifier furnace unit in FIG. 1.

The gasifier furnace unit 214 includes the gasifier furnace 1 and the syngas cooler 102 as illustrated in FIG. 2.

The gasifier furnace 1 is formed to extend in the vertical direction, pulverized coal and oxygen are supplied to the lower side in the vertical direction, and raw gas gasified through partial combustion is distributed from the lower side toward the upper side in the vertical direction. The gasifier furnace 1 has a pressure vessel 2 and a gasifier furnace wall (furnace wall) 111 provided inside the pressure vessel 2. Also, an annulus portion 115 is formed in the gasifier furnace 1 in a space between the pressure vessel 2 and the gasifier furnace wall 111. Also, in the gasifier furnace 1, a combustor portion 3, a diffuser portion 117, and a reductor portion 118 are formed in a space inside the gasifier furnace wall 111 in order from the lower side in the vertical direction (that is, from the upstream side of the distribution direction of the raw syngas).

Figure 3:
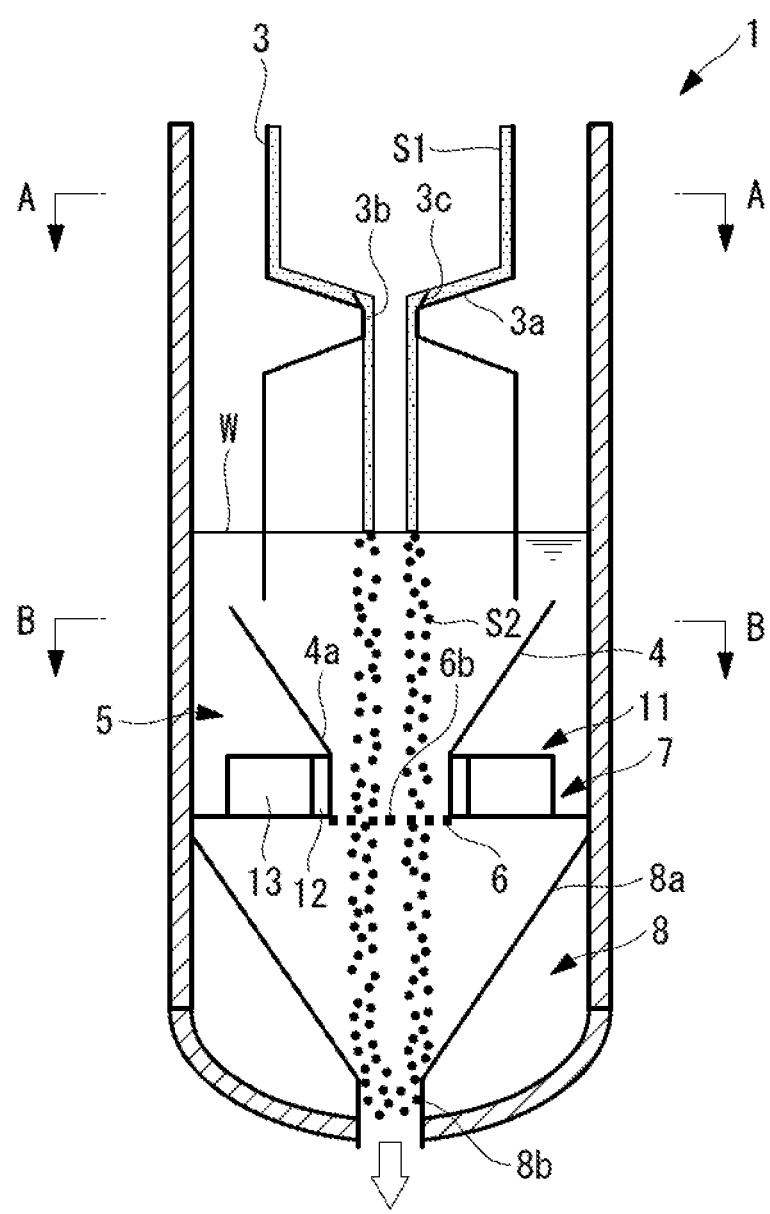
FIG. 3 is a vertical sectional view of a gasifier furnace according to a first embodiment of the present invention.

The pressure vessel 2 is provided with a slag discharge device 5 formed into a tubular shape with a hollow space therein, having a gas discharge port 121 formed at an upper end portion thereof, and provided with a slag bath 4 formed at a lower portion thereof to discharge solidified slag from the pressure vessel 2 (see FIG. 3). Note that the slag bath 4 and the slag discharge device 5 are not illustrated in FIG. 2 for convenience of explanation using the illustration. Details of the structure for discharging, from the pressure vessel 2 using the slag discharge device 5 and the like, the slag as a foreign matter dropping from the combustor portion 3 and then solidified will be described later.

The gasifier furnace wall 111 is formed into a tubular shape with a hollow space therein, and a wall surface thereof is provided to face the inner surface of the pressure vessel 2. In the embodiment, the pressure vessel 2 has a cylindrical shape, and the diffuser portion 117 of the gasifier furnace wall 111 is also formed into a cylindrical shape. Also, the gasifier furnace wall 111 is coupled to the inner surface of the pressure vessel 2 with a support member, which is not illustrated.

The gasifier furnace wall 111 separates the inside of the pressure vessel 2 into an inner space 154 and an outer space 156. The gasifier furnace wall 111 has a cross sectional shape that is a shape changing at the diffuser portion 117 between the combustor portion 3 and the reductor portion 118 as will be described later. The gasifier furnace wall 111 has an upper end portion located on the vertically upper side connected to the gas discharge port 121 of the pressure vessel 2 and has a lower end portion located on the vertically lower side with a gap from a bottom portion of the pressure vessel 2. Also, cooling water W is stored at the bottom portion of the pressure vessel 2, and the inside and the outside of the gasifier furnace wall 111 are sealed by the lower end portion of the gasifier furnace wall 111 soaking in the cooling water W. Burners 126 and 127 are inserted into the gasifier furnace wall 111, and the syngas cooler 102 is disposed in the inner space 154. The structure of the gasifier furnace wall 111 will be described later.

The annulus portion 115 corresponds to a space formed inside the pressure vessel 2 and a space outside the gasifier furnace wall 111, that is, the outer space 156, and nitrogen that is non-reactive gas separated by the air separation unit 42 is supplied thereto through the nitrogen supply line, which is not illustrated. Thus, the annulus portion 115 is a space filled with the nitrogen. Note that an intra-furnace pressure equalizer pipe, which is not illustrated, for equalizing the pressure in the gasifier furnace 1 is provided in the vicinity of the upper portion of the annulus portion 115 in the vertical direction. The intra-furnace pressure equalizer pipe is provided to establish communication between the inside and the outside of the gasifier furnace wall 111 and substantially equalizes the pressure such that a pressure difference between the inside of the gasifier furnace wall 111 (the combustor portion 3, the diffuser portion 117, and the reductor portion 118) and the outside (the annulus portion 115) fall within a predetermined pressure.

The combustor portion 3 is a space in which the pulverized coal and the char are partially burned with air, and a plurality of combustion devices configured of the plurality of burners 126 are disposed on the gasifier furnace wall 111 of the combustor portion 3. The combustion gas at a high temperature that has partially burned the pulverized coal and the char at the combustor portion 3 passes through the diffuser portion 117 and then flows into the reductor portion 118.

The reductor portion 118 is a space in which the pulverized coal is supplied to the combustion gas from the combustor portion 3 maintained at a high-temperature state required for a gasification reaction, partial combustion is caused, and the pulverized coal is decomposed into volatile content (carbon monoxide, hydrogen, lower hydrocarbon, and the like) and then gasified to generate raw syngas, and the combustion devices configured of the plurality of burners 127 are disposed on the gasifier furnace wall 111 of the reductor portion 118.

The syngas cooler 102 is provided inside the gasifier furnace wall 111 and is provided on the upper side of the burners 127 of the reductor portion 118 in the vertical direction. The syngas cooler 102 is a heat exchanger, and an evaporator 131, a superheater 132, and an economizer 134 are disposed in order from the lower side of the gasifier furnace wall 111 in the vertical direction (the upstream side in the distribution direction of the raw syngas). The syngas cooler 102 performs heat exchange with the raw syngas generated in the reductor portion 118, thereby cooling the raw syngas. Also, the numbers of the evaporator 131, the superheater 132, and the economizer 134 are not limited to the numbers illustrated in the drawing.

Here, operations of the aforementioned gasifier furnace unit 214 will be described.

In the gasifier furnace 1 of the gasifier furnace unit 214, nitrogen and the pulverized coal are put thereinto and ignited by the burners 127 of the reductor portion 118, and also the pulverized coal and the char are put thereinto with the compressed air (oxygen) and ignited by the burners 126 of the combustor portion 3. Then, high-temperature combustion gas is generated through the combustion of the pulverized coal and the char in the combustor portion 3. Also, in the combustor portion 3, molten slag S1 (see FIG. 3 and the like) is generated in high-temperature gas through the combustion of the pulverized coal and the char, and the molten slag S1 adheres to the gasifier furnace wall 111 and drops into the cooling water W. The molten slag S1 that has dropped into the cooling water W is solidified into water-granulated slag (slag) S2, a predetermined treatment is performed thereon, and the water granulated slag S2 is then discharged to the foreign matter removing unit 48. Note that details of a slag discharge method will be described below.

On the other hand, the high-temperature combustion gas generated in the combustor portion 3 moves up to the reductor portion 118 through the diffuser portion 117. The reductor portion 118 is maintained at a high-temperature state required for a gasification reaction, the pulverized coal is mixed with the high-temperature combustion gas therein, and the pulverized coal is partially burned in a high-temperature reducing atmosphere to cause a gasification reaction, thereby generating the raw syngas. The gasified raw syngas is distributed from the lower side toward the upper side in the vertical direction.

Hereinafter, a structure that is a structure provided at a lower portion of the gasifier furnace 1 to discharge slag that is a foreign matter from the pressure vessel 2 will be described in detail using FIGS. 3 to 8. The structure for discharging the slag is configured mainly of the slag bath 4 adapted to receive the molten slag S1 dropping from the combustor portion 3 and the slag discharge device 5 adapted to treat the water-granulated slag S2 that is solidified molten slag S1.

Figure 4:
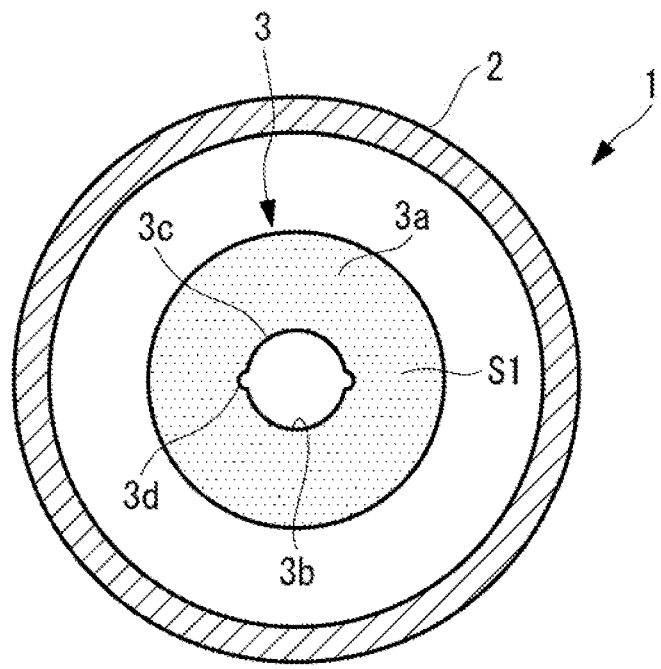
FIG. 4 is a sectional view in the direction of the arrow A-A in FIG. 3.

As illustrated in FIG. 3, a bottom surface portion 3a with an opening diameter gradually reduced toward the lower side is provided at the lower end portion of the combustor portion 3. As illustrated in FIG. 4 as well, a circular opening 3b penetrating in the up-down direction is formed, and a plurality of (two in an example of the embodiment) wall portions 3c provided so as to stand in the up-down direction along the edge of the opening 3b are provided, at substantially the center of the bottom surface portion 3a in a plan view in the example of the embodiment. In the case in which the number of wall portions 3c is two, each of the wall portions 3c is formed into an arc shape with an angle that is slightly smaller than 180 degrees, and the wall portions 3c are disposed such that ends thereof in the circumferential direction are separated from each other, thereby forming slag flowing-down ports 3d. In other words, the opening 3b formed at the bottom surface portion 3a is surrounded by the two wall portions 3c, and the gap formed between the two wall portions 3c communicates with the space outside the wall portions 3c through the slag flowing-down ports 3d.

The molten slag S1 melted in the combustor portion 3 is lowered with its gravity along the inner circumferential surface (that is, the inner circumferential surface of the gasifier furnace wall 111) and the bottom surface portion 3a of the combustor portion 3, flows from the slag flowing-down ports 3d into the opening 3b, flows downward through the openings 3b along the two slag flowing-down ports 3d in the embodiment, and drops to two locations.

Note that although the combustor portion 3 according to the embodiment is of the entrained-flow type, the combustor portion 3 is not limited thereto and may be of a fluidized-bed type or a fixed-bed type.

The slag bath 4 is a tubular member with an inner surface with a reverse truncated quadrangular pyramid shape or a reverse circular conical shape and is disposed at a lower portion of the combustor portion 3. The slag bath 4 and the combustor portion 3 are disposed such that central axes thereof in the up-down direction are located coaxially.

The lower portion inside the gasifier furnace 1 is filled with the cooling water W, and the water surface of the cooling water W is adjusted to be located between an upper end of the slag bath 4 and a lower end of the combustor portion 3. In other words, the slag bath 4 is in a submerged state, and the inside of the slag bath 4 is filled with the cooling water W. Thus, the molten slag S1 generated by and dropping from the combustor portion 3 is rapidly cooled with the cooling water W inside the slag bath 4. The rapidly cooled molten slag S1 is water-granulated and solidified to form the water-granulated slag (slag) S2, is crushed into minute pieces by a crushing device 7, and is then collected at a lower portion of the slag bath 4. The water-granulated slag S2 collected at the lower portion of the slag bath 4 passes through an opening 4a formed at a lower end of the slag bath 4 and is then supplied to the slag discharge device 5.

Also, the slag bath 4 is disposed such that the opening 4a formed at the lower end of the slag bath 4 is located substantially vertically below the opening 3b formed at the bottom surface portion 3a of the combustor portion 3.

The slag discharge device 5 is disposed at a lower portion of the slag bath 4. The slag discharge device 5 has a screen mesh (capturing portion) 6 provided so as to intersect the dropping direction of the water-granulated slag S2, the crushing device (crushing means) 7 adapted to crush the water-granulated slag S2 captured by the screen mesh 6, and a discharge portion 8 adapted to discharge the water-granulated slag S2 crushed by the crushing device 7 from the pressure vessel 2.

Figure 5:
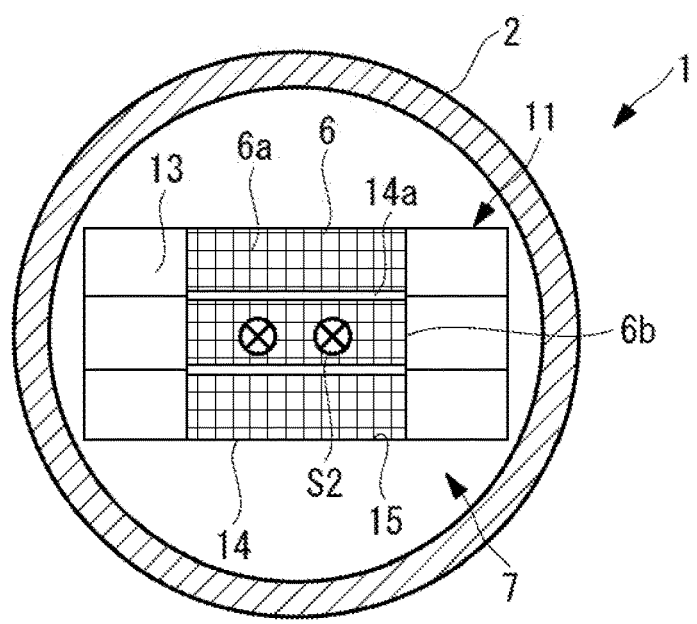
FIG. 5 is a sectional view in the direction of the arrow B-B in FIG. 3.
Figure 6:
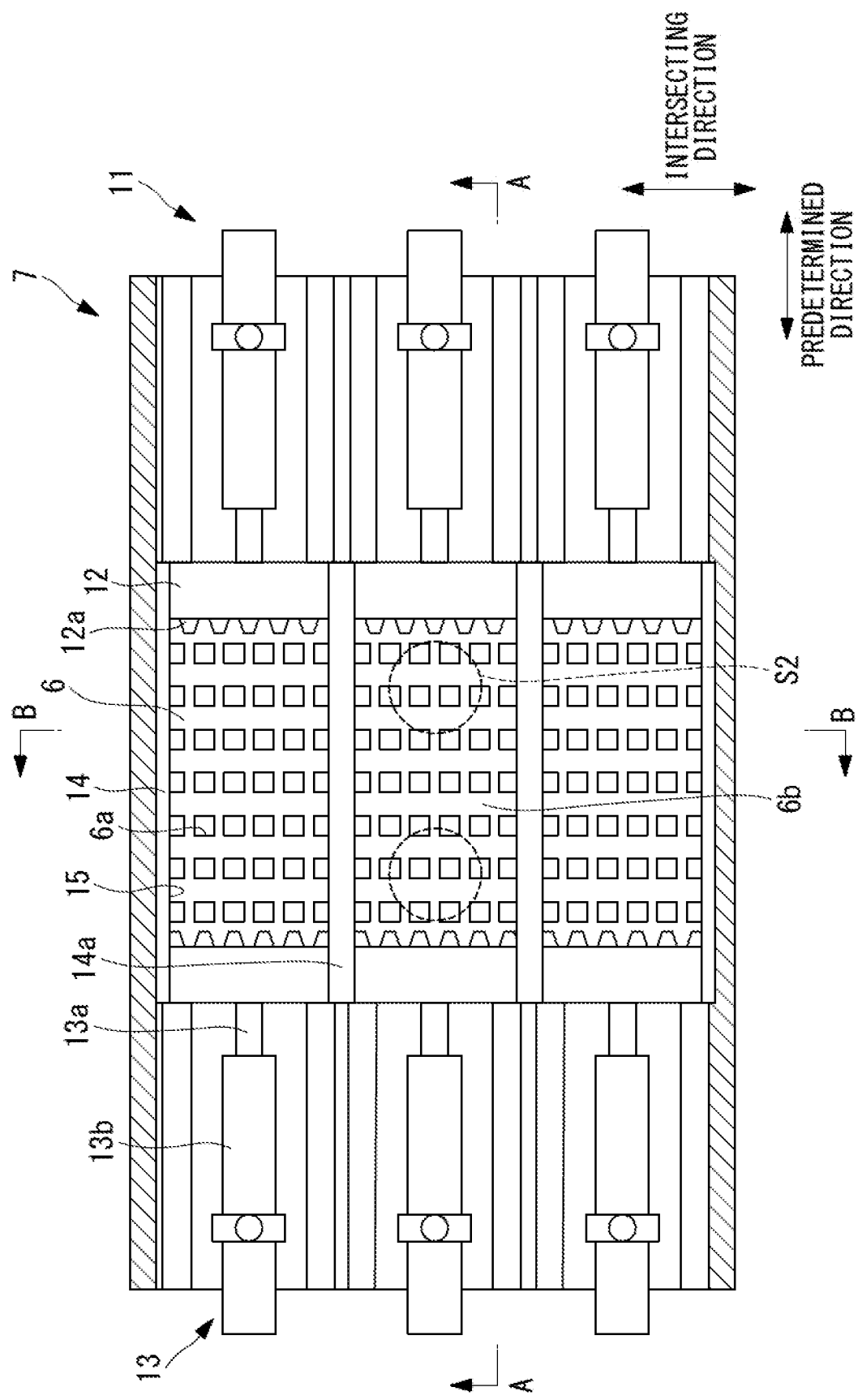
FIG. 6 is a plan view of a crushing device in FIG. 3.

As illustrated in FIGS. 5 and 6, the screen mesh 6 is a rectangular plate-shaped member that has a plurality of (rectangular in an example of the embodiment) through-holes 6a penetrating in the up-down direction, allows the water-granulated slag S2 smaller than the opening dimension of the through-holes 6a to pass therethrough, and captures the water-granulated slag S2 larger than the through-holes 6a. The screen mesh 6 is provided so as to intersect the dropping direction of the water-granulated slag S2 dropping from the combustor portion 3. The water-granulated slag S2 cooled and solidified with the cooling water W in the slag bath 4 drops onto a main capturing surface 6b that is an upper surface of the screen mesh 6 in the vertical direction. At this time, the water-granulated slag S2 larger than the opening dimension of the through-holes 6a is accumulated on the main capturing surface 6b. Note that the shape of the through-holes 6a formed in the screen mesh 6 is not limited to the rectangular shape and may be a circular shape or a polygonal shape, for example.

Also, the screen mesh 6 is disposed so as to be located substantially vertically below the opening 4a formed at the lower end of the slag bath 4.

The crushing device 7 is configured of a plurality of (three in an example of the embodiment) pairs of slag crushers 11 with each pair including two slag crushers 11. Also, the crushing device 7 includes a sonar (not illustrated) adapted to monitor whether or not the water-granulated slag S2 has been accumulated on the main capturing surface 6b that is the upper surface of the screen mesh 6 and a control device (not illustrated) adapted to drive necessary slag crushers 11 from among the plurality of slag crushers 11 on the basis of information from the sonar.

Each of the slag crushers 11 has two crusher heads (crushing portions) 12 adapted to break, with a pressure, and crush the water-granulated slag S2 accumulated on the main capturing surface 6b of the screen mesh 6, two hydraulic cylinders (drive portions) 13, each of which is adapted to reciprocate a crusher head 12 in a predetermined direction (in the up-down direction on the paper plane in FIG. 5) along the main capturing surface 6b, two guide plates (regulation portions) 14 adapted to regulate the direction of moving of the crusher head 12 when the crusher head 12 moves, that is, adapted to perform regulation such that the crusher head 12 does not move in a direction that is different form the predetermined direction (a direction that intersects the predetermined direction), and a crushing space 15 that is a space, which is sectioned by the main capturing surface 6b, the crusher head 12, and the guide plates 14, in which the water-granulated slag S2 is crushed.

The three slag crushers 11 are disposed so as to be aligned in a direction (hereinafter, referred to as an "intersecting direction") that perpendicularly intersects the predetermined direction that is the direction of moving of the crusher head 12. The three slag crushers 11 cover substantially the entire region of the main capturing surface 6b. In other words, the space above the main capturing surface 6b is included in the crushing space 15 of any of the three slag crushers 11.

Figure 7:
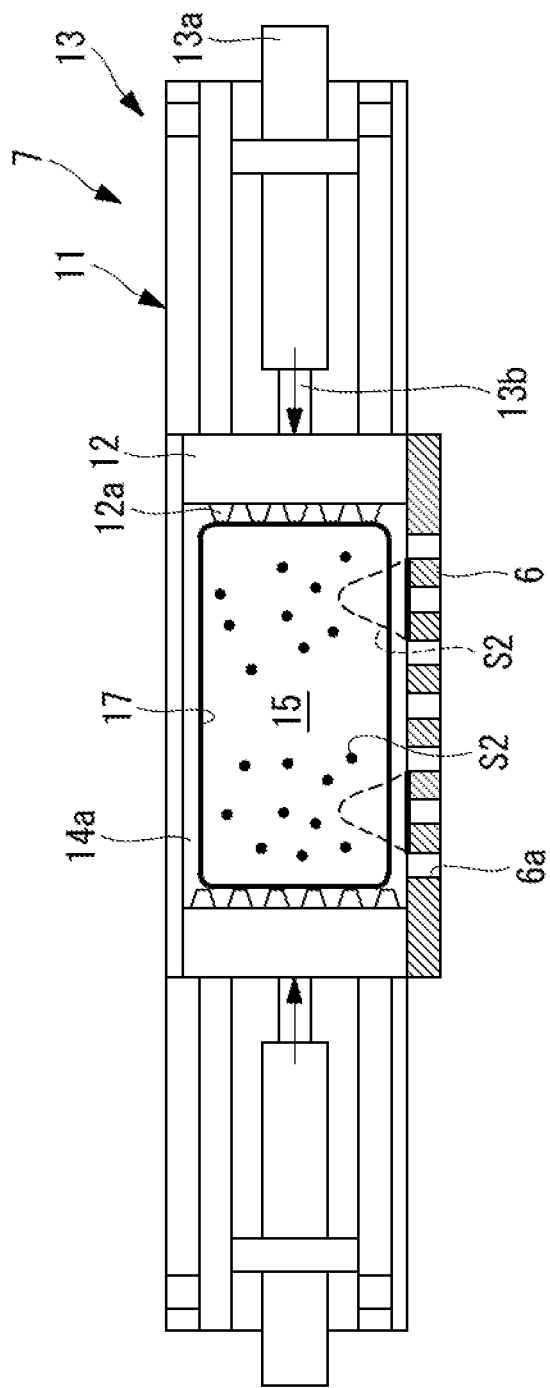
FIG. 7 is a sectional view in the direction of the arrow A-A in FIG. 6.
Figure 8:
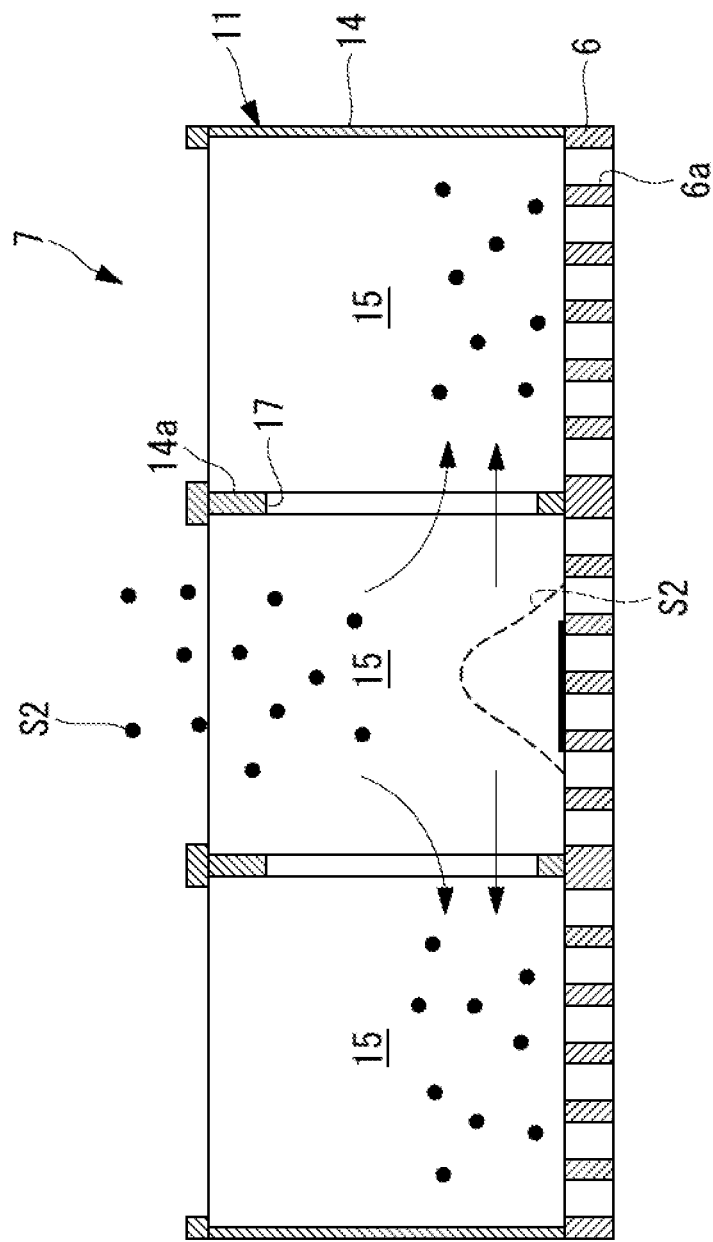
FIG. 8 is a sectional view in the direction of the arrow B-B in FIG. 6.

The two crusher heads 12 are disposed on the main capturing surface 6b of the screen mesh 6 so as to face each other. The crusher heads 12 are rectangular plate-shaped members made of a material such as stainless used steel (SUS) in terms of corrosion resistance and strength. The crusher heads 12 are caused to reciprocate on the main capturing surface 6b by the hydraulic cylinders 13. Each of the two facing crusher heads 12 moves on the main capturing surface 6b as represented by the arrow in FIG. 7 and pinches and breaks, with a pressure, the water-granulated slag S2 accumulated on the main capturing surface 6b. Note that the positions of the crusher heads 12 illustrated in FIGS. 6 and 7 are stand-by positions before the reciprocation along the main capturing surface 6b.

Also, the crusher heads 12 are provided with projecting portions 12a on facing surfaces thereof. The projecting portions 12a have truncated conical shapes in the example of the embodiment and project from the facing surfaces of the crusher heads 12 toward the facing crusher heads 12. A plurality of projecting portions 12a are disposed at intervals in the facing surfaces of the crusher heads 12. The projecting portions 12a are secured to the facing surfaces of the crusher heads 12 through welding.

Also, each of the crusher heads 12 is disposed and formed such that the uneven shapes formed by the mutually facing projecting portions 12a are engaged with each other.

A material of the projecting portions 12a is, for example, a stainless used steel (SUS)-based material in terms of corrosion resistance and strength. Note that the shape of the projecting portions 12a is not limited to the truncated conical shape and may be a circular conical shape, a polygonal pyramid shape, or a polygonal truncated pyramid shape, for example.

Each hydraulic cylinder 13 has a rod portion 13a with one end secured to each crusher head 12 and a main body portion 13b adapted to reciprocate the rod portion 13a in a predetermined direction using a hydraulic pressure. The rod portion 13a is a cylindrical member and is secured to a rear surface of the crusher head 12 that is a surface on the opposite side of the facing surface.

The guide plates 14 are secured to the main capturing surface 6b of the screen mesh 6. The guide plates 14 are provided so as to stand from the main capturing surface 6b and extends over the entire region of the screen mesh 6 along a predetermined direction in the embodiment.

Also, each of the slag crusher 11 is provided with the two guide plates 14 as described above. The two guide plates 14 are disposed away from each other by a predetermined interval in the intersecting direction so as to be substantially parallel to each other. The separation distance between the two guide plates 14 are set to a distance that is slightly longer than the length of each crusher head 12 in the intersecting direction. The facing surfaces of the two guide plates 14 restrict the direction of moving of each crusher head 12 when the crusher head 12 moves and restrict the crusher head 12 such that the crusher head 12 does not move in the direction that intersects the predetermined direction.

Note that the guide plates 14 are not limited to ones extending over substantially the entire region of the screen mesh 6 and may be split into a plurality of pieces and provided so as to stand within such a range that the split guide plates 14 do not interfere with the moving of the crusher head 12.

The crushing space 15 is a space with a substantially rectangular parallelepiped shape that has a lower end defined by the main capturing surface 6b of the screen mesh 6, has end portions in the predetermined direction defined by the facing surfaces of the crusher heads 12, and has end portions in the intersecting direction defined by the facing surfaces of the guide plates 14. The upper side of the crushing space 15 is opened, and the water-granulated slag S2 is supplied from the upper side into the crushing space 15.

Since each of three pairs of slag crushers 11 with each pair including two slag crushers 11 has its own crushing space 15 in the embodiment, the crushing device 7 according to the embodiment has three crushing spaces 15. As described above, the three crushing spaces 15 are disposed so as to be aligned in the intersecting direction. Thus, the adjacent crushing spaces 15 are sectioned by the positions of the guide plates 14. In other words, the guide plates 14 have communication openings 17 as will be described later, and regions other than the communication openings 17 of the guide plates 14 sandwiched between the crushing spaces 15 among the guide plates 14 play a role in restricting the moving of the crusher heads 12 in the intersecting direction and also play a role as partitioning walls that isolate the crushing spaces 15 from each other. Hereinafter, the guide plates 14 with the communication openings 17 formed therein that also serve as partitioning walls will be referred to as partitioning wall guide plates 14a.

In the crushing device 7 according to the embodiment, there are three slag crushers 11, and four guide plates 14 are thus disposed so as to be aligned at predetermined separation distances in the intersecting direction. Out of these four guide plates 14, the second and third guide plates 14 that isolate the central crushing space 15 are partitioning wall guide plates 14a. The first and fourth guide plates 14 on both end sides in the intersecting direction may not be the partitioning wall guide plates 14a. As illustrated in FIG. 7, one communication opening (communication portion) 17 penetrating in the intersecting direction is formed at substantially the central region on each partitioning wall guide plate 14a. The two crushing spaces 15 that the partitioning wall guide plate 14a faces communicate with each other through the communication opening 17.

The sonar (not illustrated) monitors whether or not the water-granulated slag S2 has been accumulated on the main capturing surface 6b of the screen mesh 6 and transmits information regarding the monitoring to the control device (not illustrated).

The control device receives the information from the sonar. In a case in which the control device determines that the water-granulated slag S2 has been accumulated on the main capturing surface 6b on the basis of the information from the sonar, the control device determines which crushing space 15 out of the three crushing spaces 15 the water-granulated slag S2 has been accumulated in, drives the hydraulic cylinder 13 corresponding to the crushing space 15 in which the water-granulated slag S2 has been accumulated, and crushes the water-granulated slag S2 using the crusher head 12.

The control device is configured of, for example, a central processing unit (CPU), a random access memory (RAM), a read only memory (ROM), a computer readable storage medium, and the like. A series of processes for realizing various functions are stored in the form of a program in the storage medium or the like in one example, and the various functions are realized by the CPU reading the program in the RAM or the like and executing processing of modification and arithmetic operations on the information. Note that a form in which the program is installed in advance in the ROM or another storage medium, a form in which the program is provided in a state in which the program is stored in a computer-readable storage medium, a form in which the program is distributed via a wired or wireless communication means, or the like may be applied. The computer-readable storage medium is a magnetic disk, a magneto-optical disk, a CD-ROM, a DVD-ROM, a semiconductor memory, or the like.

The discharge portion 8 is disposed at a lower portion of the crushing device 7 in the vertical direction. The discharge portion 8 has a lower hopper 8a with a tubular inner surface shape with a reverse truncated conical shape or a reverse circular conical shape adapted to receive the crushed water-granulated slag S2, a discharge pipe 8b adapted to communicate with the opening at the lower portion of the lower hopper 8a, and an opening and closing valve on the downstream side of the discharge pipe 8b, which is not illustrated. The discharge pipe 8b extends in the up-down direction and penetrates through the lower end portion of the pressure vessel 2.

Next, a slag discharge method of the gasifier furnace 1 according to the embodiment will be described.

The molten slag S1 generated by the combustor portion 3 flows down from the slag flowing-down ports 3d. The molten slag S1 that has flowed down drops into the cooling water W and is rapidly cooled with the cooling water W. The cooled molten slag S1 is solidified and crushed through the rapid cooling to form the water-granulated slag S2. The water-granulated slag S2 settles down in the water due to its gravity and drops onto the main capturing surface 6b of the screen mesh 6.

Out of the water-granulated slag S2 dropping onto the main capturing surface 6b of the screen mesh 6, the water-granulated slag S2 smaller than the opening dimension of the through-holes 6a formed in the screen mesh 6 passes through the through-holes 6a, drops into the lower hopper 8a, and is then discharged to the outside of the pressure vessel 2 via the discharge pipe 8b. On the other hand, the water-granulated slag S2 larger than the opening dimension of the through-holes 6a cannot pass through the through-holes 6a and is accumulated on the main capturing surface 6b. At this time, the water-granulated slag S2 is accumulated in any of the three crushing spaces 15. However, the water-granulated slag S2 is more likely to be accumulated in the crushing space 15 located vertically below the slag flowing-down port 3d (the crushing space 15 disposed at the center from among the three crushing spaces 15 in the embodiment).

If the water-granulated slag S2 is accumulated on the main capturing surface 6b of the screen mesh 6, then the control device (not illustrated) determines which crushing space 15 out of the three crushing spaces 15 the water-granulated snag S2 has been accumulated in, on the basis of the information from the sonar. Then, the control device drives the hydraulic cylinder 13 corresponding to the crushing space 15 in which the water-granulated slag S2 is determined to have been accumulated and reciprocates the two crusher heads 12 in the predetermined direction. At this time, the direction of the moving of the crusher heads 12 is restricted by the guide plate 14, and the direction of moving is restricted such that the crusher heads 12 do not move in the direction that intersects the predetermined direction.

The crusher heads that has reciprocated in the predetermined direction sandwich the water-granulated slag S2 with the projecting portions 12a disposed on a facing surface and the projecting portions 12a disposed on a facing surface of the other crusher head 12 at the facing position in an engaged manner, thereby breaking, with a pressure, and crushing the water-granulated slag S2. At this time, a part of the crushed water-granulated slag S2 passes through the communication openings 17 formed in the partitioning wall guide plates 14a and moves to adjacent crushing spaces 15 due to a pressure of the crusher head 12 and generation of a water flow (see the arrows in FIG. 8). If the water-granulated slag S2 passes through the communication openings 17 and reciprocates into the adjacent crushing spaces 15, and accumulation of the water-granulated slag S2 on the main capturing surface 6b in the adjacent crushing spaces 15 advances, then the control device determines that the water-granulated slag S2 has been accumulated on the basis of information from the sonar, drives the corresponding hydraulic cylinder 13, reciprocates the two crusher heads 12 in the predetermined direction, and breaks, with a pressure, and crush the water-granulated slag S2.

The water-granulated slag S2 that has been crushed by the crusher heads 12 into a size smaller than the opening dimension of the through-holes 6a passes through the through-holes 6a and is discharged to the outside of the pressure vessel 2 via the lower hopper 8a and the discharge pipe 8b. The water-granulated slag S2 discharged from the pressure vessel 2 flows into the foreign matter removing unit 48. On the other hand, the water-granulated slag S2 that is still larger than the opening dimension of the through-holes 6a even after the crushing and the water-granulated slag S2 has not suitably been crushed are continuously accumulated on the main capturing surface 6b of the screen mesh 6. The water-granulated slag S2 continuously accumulated is crushed again by the crusher heads 12. This is repeated until the water-granulated slag S2 becomes smaller than the opening dimension of the through-holes 6a.

According to the embodiment, the following effects are achieved.

In the embodiment, the water-granulated slag S2 is crushed into a size smaller than the opening dimension of the through-holes 6a by the crushing device 7 and is then discharged from the pressure vessel 2. It is possible to cause the water-granulated slag S2 discharged from the gasifier furnace 1 to have a size that is equal to or less than the predetermined particle size in this manner and thereby to prevent blockage of the flow path for discharging the water-granulated slag S2 to the outside of the pressure vessel 2.

Also, in the embodiment, the slag flowing-down ports 3d for causing the molten slag S1 to flow down are provided at the bottom surface portion 3a of the combustor portion 3, and the molten slag S1 is caused to flow down along the slag flowing-down ports 3d. It is thus possible to stably cause the molten slag S1 to flow down.

Since the molten slag S1 is caused to flow down from the slag flowing-down ports 3d, localized accumulation of the water-granulated slag S2 accumulated on the main capturing surface 6b of the screen mesh 6 may occur. However, the communication openings 17 are formed in the partitioning wall guide plates 14a in the embodiment. In this manner, when the crusher heads 12 breaks, with a pressure, the water-granulated slag S2 inside the crushing space 15 in which the localized accumulation of the wager-granulated slag S2 has occurred, a part of the crushed water-granulated slag S2 passes through the communication openings 17 and moves into other adjacent crushing spaces 15 due to a pressure of the crusher heads 12 and generation of a wafer flow (see the arrows in FIG. 8). Since a part of the water-granulated slag S2 is distributed to the plurality of crushing spaces 15 in this manner, it is possible to curb uneven distribution of the water-granulated slag S2 to a specific crushing space 15. Thus, it is possible to curb positional localization of the water-granulated slag S2 passing through the through-holes 6a formed in the screen mesh 6. Therefore, it is possible to curb localization of damage due to friction and the like of the screen mesh 6 when the water-granulated slag S2 passes therethrough, to curb damage on the entire screen mesh 6, and thereby to extend the lifetime.

Also, it is possible to curb uneven distribution of the water-granulated slag S2 to a specific crushing space 15 even with the configuration of the plurality of crushing spaces 15 and thereby to curb a situation in which the water-granulated slag S2 is crushed only with a specific slag crusher 11 at an unevenly high frequency, even with the configuration of the plurality of slag crushers 11. It is thus possible to equalize working frequencies of the plurality of slag crushers 11, to reduce a load, to improve reliability, and to extend the product lifetime of each slag crusher 11.

Also, the guide plates 14 restrict the direction of moving of the crusher heads 12 in the predetermined direction and restricts the direction of moving such that the crusher heads 12 do not move in the direction that intersect the predetermined direction in the embodiment. In this manner, it is possible to stably cause the crusher heads 12 to move in the predetermined direction when the crusher heads 12 reciprocate in the predetermined direction. Also, even in a case in which a reaction force such as a pressurizing force acts on the crusher heads 12 in a direction that intersects the predetermined direction when the crusher heads 12 moves to break, with a pressure, and crush the water-granulated slag S2, the direction of moving of the crusher heads 12 is restricted only to the predetermined direction by the crusher heads 12 and the facing surfaces of the guide plates 14 abutting on each other. In this manner, it is possible to reduce the reaction force such as a pressurizing force on the crusher heads 12 in a direction that is different from the predetermined direction, thereby to cause the pressurizing force to focus on the predetermined direction, and to suitably crush the water-granulated slag S2. Also, since the guide plates 14 curb a state in which the crusher heads 12 do not move in parallel (so-called swinging), it is possible to reduce a load on the rod portions 13a supporting the crusher heads 12 in a direction that is different from the predetermined direction, to curb damage on portions joined to the rod portions 13a and the crusher heads 12, and to improve reliability.

Second Embodiment

Figure 9:
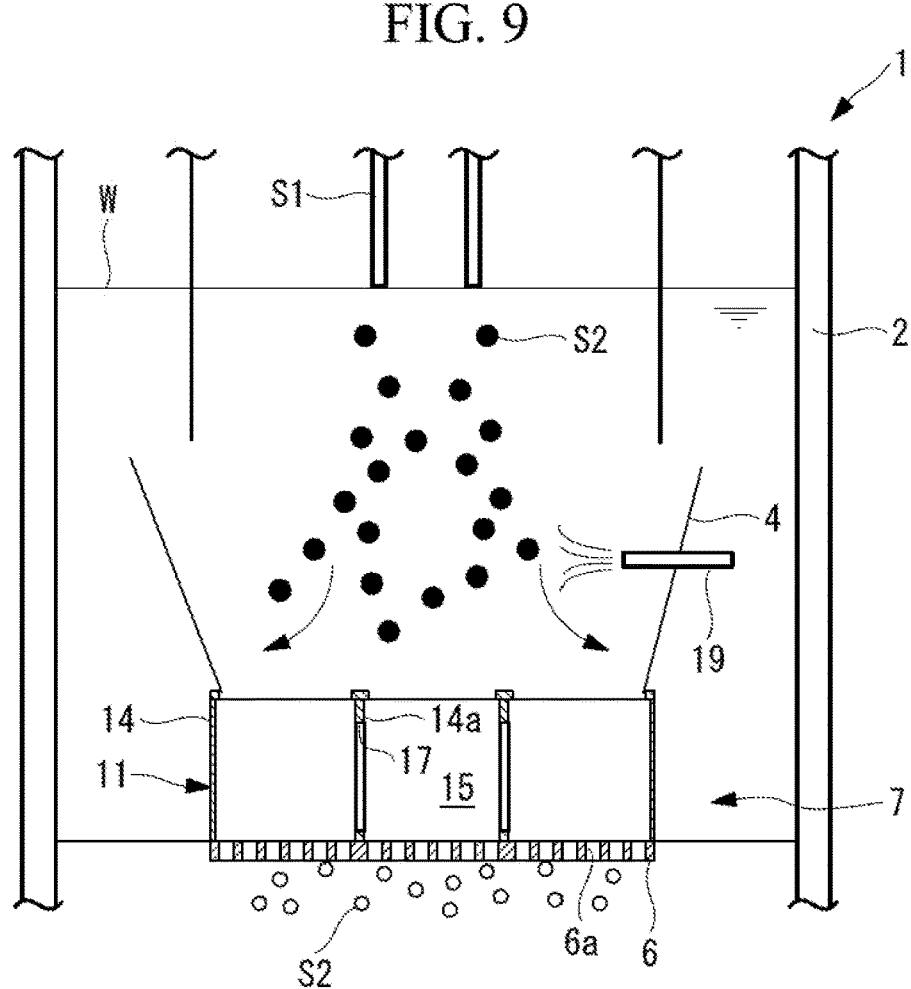
FIG. 9 is a vertical sectional view of main components of a gasifier furnace according to a second embodiment of the present invention.
Figure 10:
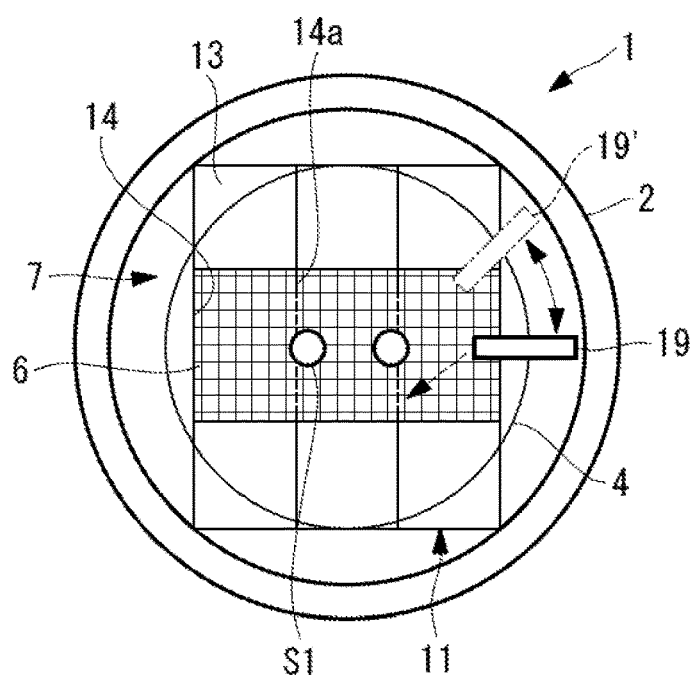
FIG. 10 is a plan view of a crushing device in FIG. 9.

Next, a second embodiment of the present invention will be described using FIGS. 9 and 10.

The embodiment is different from the first embodiment in that a water supply nozzle (jetting means) 19 is provided on a side surface of the slag bath 4. The same reference signs will be applied to the same configurations as those in the first embodiment, and detailed description thereof will be omitted.

The water supply nozzle 19 is disposed on the side surface of the slag bath 4 at a position higher than the upper ends of the guide plates 14 by a predetermined height H and is also disposed such that the longitudinal direction (the direction in which water is jetted) thereof follows the intersecting direction. Also, the water supply nozzle 19 is adapted to jet water (fluid) in the direction that is a horizontal direction and the intersecting direction. Also, the jetting direction of the water supply nozzle 19 passes through the position vertically below the slag flowing-down ports 3d, and water is jetted so as to be brought into contact with the water-granulated slag S2 that is about to be accumulated on the main capturing surface 6b of the screen mesh 6 after the molten slag S1 generated in and dropping from the combustor portion 3 is rapidly cooled with the cooling water W inside the slag bath 4.

According to the embodiment, the following effects are achieved.

In the embodiment, the three crushing spaces 15 are disposed so as to be aligned in the intersecting direction, and the water supply nozzle 19 provided at the slag bath 4 disposed between the combustor portion 3 and the screen mesh 6 is adapted to jet water (fluid) in the direction that intersects the dropping direction of the water-granulated slag S2. In other words, the water supply nozzle 19 is adapted to jet water (fluid) in the alignment direction of the crushing spaces 15. In this manner, the water-granulated slag S2 dropping from the combustor portion 3 is dispersed in the alignment direction of the crushing spaces 15 with the water jetted from the water supply nozzle 19. Therefore, since the water-granulated slag S2 is distributed to each crushing space 15 in a dispersed manner, it is possible to curb uneven distribution of the water-granulated slag S2 to one crushing space 15.

Note that although the water is jetted in the intersecting direction from the water supply nozzle 19 in the aforementioned embodiment, the jetting direction of the water-supply nozzle is not limited thereto. As illustrated by the dashed line in FIG. 10, for example, a water supply nozzle 19' may be provided with inclination at a predetermined angle with respect to the intersecting direction. In other words, the jetting direction of the water supply nozzle may be a direction with inclination at a predetermined angle with respect to the intersecting direction to generate a swirling flow above the crushing spaces 15. By jetting water in this manner, it is possible to cause a centrifugal force to act on the dropping water-granulated slag S2, to more suitably distribute the water-granulated slag S2 to each crushing space 15 in a dispersed manner, and to curb uneven distribution of the water-granulated slag S2 to one crushing space 15.

Also, although the example in which a single water supply nozzle 19 is provided has been described in the aforementioned embodiment, the present invention is not limited thereto. A plurality of water supply nozzles 19 may be provided.

Third Embodiment

Figure 11:
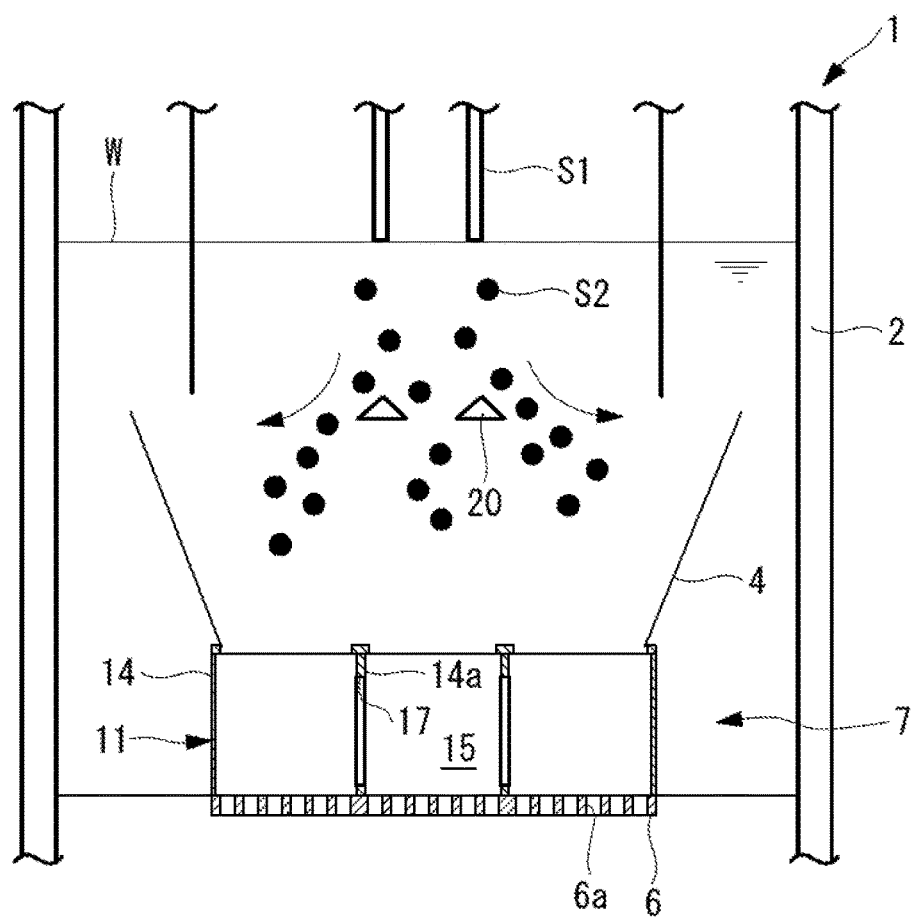
FIG. 11 is a vertical sectional view of main components of a gasifier furnace according to a third embodiment of the present invention.
Figure 12:
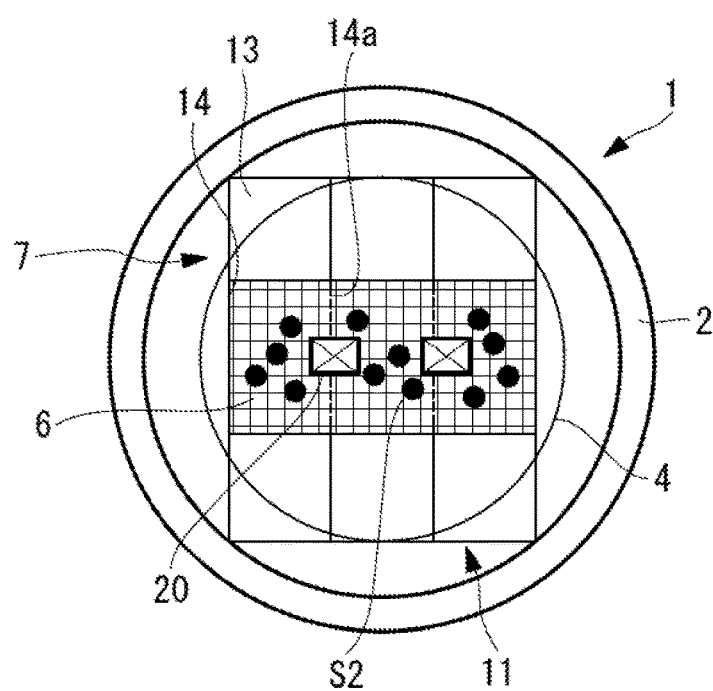
FIG. 12 is a plan view of a crushing device in FIG. 11.

Next, a third embodiment of the present invention will be described using FIGS. 11 and 12.

The embodiment is different from the first embodiment in that dispersing plates (distribution portions) 20 are provided vertically below the slag flowing-down ports 3d. The same reference signs will be applied to the same configurations as those in the first embodiment, and detailed description thereof will be omitted.

Two dispersing plates 20 are provided between the combustor portion 3 and the screen mesh 6 and are provided so as to be brought into contact with the water-granulated slag S2 that is about to be accumulated on the main capturing surface 6b of the screen mesh 6 after the molten slag S1 generated in and dropping from the combustor portion 3 is rapidly cooled with the cooling water W inside the slag bath 4. More specifically, the dispersing plates 20 are provided in the vicinity of the upper end of the slag bath 4. The dispersing plates 20 have a quadrangular pyramid shape obtained by joining four triangular plate materials to each other, for example, and are formed of a material with friction resistance (for example, with an $Al_2O_3$ ceramic surface). Also, each of the two dispersing plates 20 is disposed such that the apex of the quadrangular pyramid shape is located substantially vertically below each of the two slag flowing-down ports 3d. With such disposition, the dispersing plates 20 disperse the water-granulated slag S2 dropping from the combustor portion 3 in the intersecting direction.

According to the embodiment, the following effects are achieved.

In the embodiment, the three crushing spaces 15 are disposed so as to be aligned in the intersecting direction, and the dispersing plates 20 provided between the combustor portion 3 and the screen mesh 6 disperse the water-granulated slag S2 in the intersecting direction. In other words, the dispersing plates 20 distribute the water-granulated slag S2 in a dispersed manner in the alignment direction of the three crushing spaces 15. Thus, since the slag is distributed to the three crushing spaces 15 in a dispersed manner, it is possible to curb uneven distribution of the water-granulated slag S2 to one crushing space 15.

Note that the example in which the two dispersing plates 20 are provided has been described in the aforementioned embodiment, the present invention is not limited thereto. A single dispersing plate 20 may be provided, or three or more dispersing plates 20 may be provided. In addition to providing a plurality of dispersing plates 20 in a plane, the dispersing plates 20 may be disposed in a plurality of levels in the up-down direction.

Also, the shape of the dispersing plates 20 is also not limited to the aforementioned embodiment. For example, the conical shape may be a polygonal pyramid shape such as a triangular pyramid shape or may be a circular conical shape.

Note that the present invention is not limited to the inventions according to the aforementioned embodiments, and modifications can appropriately be made without departing from the gist thereof.

For example, although the example using the crushing device 7 adapted such that the mutually facing crusher heads 12 sandwich and crush the water-granulated slag S2 has been described in each of the aforementioned embodiments, the crushing device is not limited thereto. For example, a single crusher head 12 may be provided, and the water-granulated slag S2 may be sandwiched and crushed between the crusher head 12 and a wall surface.

Also, although the example in which the sonar is provided to monitor the water-granulated slag S2 on the screen mesh 6 has been described in each of the aforementioned embodiments, the present invention is not limited thereto. For example, a sensor using a light beam or an electromagnetic wave may be used instead of the sonar. Also, the sonar may not be provided, and the hydraulic cylinders 13 may be driven every predetermined time to cause the crusher heads 12 to move, for example.

Also, although the example in which one communication opening is formed in each partitioning wall guide plate as a communication portion that establishes communication between adjacent crushing spaces has been described in each of the aforementioned embodiments, the present invention is not limited thereto. For example, openings may be disposed and formed at a plurality of locations.

Also, the aforementioned embodiments may be combined with each other.

Although the pulverized coal and the char have been described as examples of powder fuel in each of the aforementioned embodiments, the present invention is not limited thereto. As the coal, other carbonaceous feedstock such as high-grade coal and low-grade coal, can also be applied. Also, the powder fuel is not limited to the coal and may be biomass used as a reusable biologically-originated organic resource, and for example, it is possible to apply the invention to other powder fuel obtained by crushing thinned wood, waste wood, driftwood, grass, wastes, sludge, tires, and recycled fuels using these as raw materials (pellets and chips).

Although a tower-type gasifier furnace has been described as the gasifier furnace 1 according to the embodiment, the present invention can similarly be carried out even if the gasifier furnace 1 is a gasifier furnace of a crossover type as long as the positional relationship between the combustor portion 3 and the slag bath 4 is similar to that in the invention.

REFERENCE SIGNS LIST

1 Gasifier furnace
2 Pressure vessel
3 Combustor portion
3a Bottom surface portion
3b Opening
3c Wall portion
3d Slag flowing-down port
4 Slag bath
5 Slag discharge device
6 Screen mesh (capturing portion)
6a Through-hole
6b Main capturing surface
7 Crushing device (crushing means)
8 Discharge portion
8a Lower hopper
8b Discharge pipe
11 Slag crusher
12 Crusher head (crushing portion)
12a Projecting portion
13 Hydraulic cylinder (drive portion)
14 Guide plate (regulation portion)
15 Crushing space
17 Communication opening (communication portion)
19 Water supply nozzle (jetting means)
20 Dispersing plate (distribution portion)
41 Compressed air supply line
42 Air separation unit
43 First nitrogen supply line
45 Second nitrogen supply line
46 Char returning line
47 Oxygen supply line
48 Foreign matter removing unit
49 Gas generation line 51 Dust collecting unit
52 Supply hopper
53 Gas discharge line
61 Compressor
62 Combustor
63 Turbine
64 Rotation shaft
65 Compressed air supply line
66 Fuel gas supply line
67 Combustion gas supply line
68 Booster
69 Turbine
70 Flue gas line
71 Steam supply line
72 Steam recovery line
73 Condenser
74 Gas purification unit
75 Stack
102 Syngas cooler
111 Gasifier furnace wall
115 Annulus portion
117 Diffuser portion
118 Reductor portion
121 Gas discharge port
126 Burner
127 Burner
131 Evaporator
132 Superheater
134 Economizer
154 Inner space
156 Outer space
210 Integrated coal gasification combined cycle (integrated gasification combined cycle)
211 Coal supply unit
211a Coal supply line
214 Gasifier furnace unit
215 Char recovery unit
216 Gas clean-up unit
217 Gas turbine
218 Steam turbine
219 Generator
220 Heat recovery steam generator
S1 Molten slag
S2 Water-granulated slag (slag)

The invention claimed is:

1. A slag discharge device that discharges, from a gasifier furnace adapted to gasify carbonaceous feedstock, slag that is generated at a combustor portion of the gasifier furnace and drops from the combustor portion, the slag discharge device comprising:
a capturing portion that is a porous member provided vertically below the combustor portion so as to intersect a dropping direction of the slag and including a plurality of through-holes formed therein, that allows the slag smaller than the through-holes to pass therethrough, and that captures the slag larger than the through-holes; and
a crusher crushing the slag captured by the capturing portion,
wherein the crusher has a plurality of crushing portions that break, with a pressure, and thus crush the slag that is present on a main capturing surface that is an upper surface of the capturing portion in a vertical direction, a drive portion that reciprocates the crushing portions in a predetermined direction along the main capturing surface, regulation portions that regulate a direction of moving of the crushing portions caused by the drive portion, and a plurality of crushing spaces that are sectioned by the main capturing surface, the crushing portions, and the regulation portions, and in which the slag is crushed,
the regulation portions have partitioning walls that isolate the plurality of crushing spaces from each other, and
in the regulation portions, a communication portion that causes the plurality of crushing spaces of the crusher to communicate with each other and that penetrates through the partitioning walls is formed.

2. The slag discharge device according to claim 1,
wherein the plurality of crushing spaces is disposed to be aligned in a direction that intersects the predetermined direction, and
a jetter jetting a fluid is provided in a direction that intersects the dropping direction of the slag and intersects the predetermined direction between the combustor portion and the capturing portion.

3. The slag discharge device according to claim 1,
wherein the plurality of crushing spaces is disposed to be aligned in a direction that intersects the predetermined direction, and
a distribution portion that distributes the slag dropping from the combustor portion in the direction intersecting the predetermined direction is provided between the combustor portion and the capturing portion.

4. A gasifier furnace comprising:
the slag discharge device according to claim 1.

5. An integrated gasification combined cycle comprising:
the gasifier furnace according to claim 4;
a gas turbine that is driven to rotate by burning at least a part of Clean syngas generated in the gasifier furnace;
a steam turbine that is driven to rotate by steam generated by a heat recovery steam generator that introduces turbine flue gas discharged from the gas turbine thereinto; and
a generator that is rotatably coupled to the gas turbine and/or the steam turbine.

6. A slag discharge method using a slag discharge device that discharges, from a gasifier furnace adapted to gasify carbonaceous feedback, slag generated at a combustor portion of the gasifier furnace and dropping from the combustor portion,
the slag discharge device including
a capturing portion that is a porous member provided vertically below the combustor portion so as to intersect a dropping direction of the slag and including a plurality of through-holes formed therein, that allows the slag smaller than the through-holes to pass therethrough, and that captures the slag larger than the through-holes; and
a crusher for crushing the slag captured by the capturing portion,
in which the crusher has a plurality of crushing portions that break, with a pressure, and thus crush the slag that is present on a main capturing surface that is an upper surface of the capturing portion in a vertical direction, a drive portion that reciprocates the crushing portions in a predetermined direction along the main capturing surface, regulation portions that regulate a direction of moving of the crushing portions caused by the drive portion, and a plurality of crushing spaces that are sectioned by the main capturing surface, the crushing portions, and the regulation portions, and in which the slag is crushed,
the regulation portions have partitioning walls that isolate the plurality of crushing spaces from each other, and in the regulation portions, a communication portion that causes the plurality of crushing spaces of the crusher to communicate with each other and that penetrates through the partitioning walls is formed, the slag discharge method comprising:

allowing a part of the slag to be crushed is passed through the communication portion and crushing the slag using the crusher.

* * * * *